(12) United States Patent
Okamoto et al.

(10) Patent No.: US 9,832,043 B2
(45) Date of Patent: Nov. 28, 2017

(54) BANDWIDTH BOOSTING IN SHARED LOCAL NETWORKS

(71) Applicant: Verizon Patent and Licensing Inc., Basking Ridge, NJ (US)

(72) Inventors: Kyle R. Okamoto, Los Angeles, CA (US); Deepak Trikannad, Irvine, CA (US); Christopher T. Carey, Manhattan Beach, CA (US); Shawn M. Strickland, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 57 days.

(21) Appl. No.: 14/175,364

(22) Filed: Feb. 7, 2014

(65) Prior Publication Data

US 2015/0229584 A1    Aug. 13, 2015

(51) Int. Cl.
*H04L 12/54* (2013.01)
*H04W 28/08* (2009.01)
*H04L 12/26* (2006.01)

(52) U.S. Cl.
CPC ......... *H04L 12/5692* (2013.01); *H04W 28/08* (2013.01); *H04L 43/0882* (2013.01)

(58) Field of Classification Search
CPC ..... H04W 4/003; H04W 28/20; H04W 28/10; H04W 48/14; H04W 428/08; H04W 4/001; H04W 28/08; H04L 69/14; H04L 47/14; H04L 47/20; H04L 47/29; H04L 67/325; H04L 41/0896; H04L 41/0893; H04L 67/306; H04L 12/5692; H04L 43/0882; H04L 67/125; H04L 67/06; H04L 67/22; H04L 67/322; H04L 41/5003; H04L 41/5009; H04L 41/5025; H04L 41/5035; H04L 47/10; H04L 47/24; H04L 47/803; H04L 47/808; H04L 12/58; H04L 12/587; H04L 65/1083; H04L 65/4023; G06Q 40/12; G06Q 20/20; G06Q 10/06375; G06F 3/0481; G06F 17/30371; G06F 15/177;
(Continued)

(56) References Cited

U.S. PATENT DOCUMENTS 7,003,580 B1 * 2/2006 Cook ................. H04L 12/5692
                                                        709/227
7,290,129 B2 * 10/2007 Chebolu ............. G06F 9/44505
                                                        713/150
(Continued)

*Primary Examiner* — Vivek Srivastava
*Assistant Examiner* — Todd L Barker

(57) ABSTRACT

A network device provides, to a user device, a user interface to configure preferences for a bandwidth boosting service. The bandwidth boosting service is configured to supplement a subscriber's primary content delivery connection with additional bandwidth from a broadband cellular connection. The network device receives, via the user interface, user configuration preferences for the bandwidth boosting service and provides, to a boosting router at a local subscriber network, configuration settings that are based on the configuration preferences. The network device receives, from the boosting router, a boost request for content delivery to a user device at the local subscriber network and generates, in response to the boost request, a split-path instruction for the content delivery to the local subscriber network via a primary data path and a supplemental data path.

20 Claims, 12 Drawing Sheets

(58) Field of Classification Search
CPC .......... G06F 15/44505; H04N 21/4333; H04N 21/4532; H04N 21/4882; H04M 2207/14
See application file for complete search history.

(56) References Cited

U.S. PATENT DOCUMENTS

| | | | | |
|---|---|---|---|---|
| 8,239,516 B2* | 8/2012 | Huslak | ............... | H04L 67/06 709/224 |
| 8,386,653 B2* | 2/2013 | Wright | ............... | G06F 15/177 710/10 |
| 8,442,484 B2* | 5/2013 | Rubin et al. | ............... | 455/405 |
| 8,475,280 B2* | 7/2013 | Gould | ............... | A63F 13/12 370/236 |
| 8,626,115 B2* | 1/2014 | Raleigh | ............... | H04L 12/1403 455/405 |
| 8,701,047 B2* | 4/2014 | Cloward | ............... | G06F 3/0481 715/853 |
| 8,787,161 B2* | 7/2014 | Adamczyk et al. | ............... | 370/230 |
| 8,794,519 B2* | 8/2014 | Malik | ............... | G06Q 30/00 235/383 |
| 8,843,122 B1* | 9/2014 | Wick | ............... | G06F 21/10 370/310.2 |
| 8,959,218 B2* | 2/2015 | Finkelstein | ............... | H04N 21/2402 709/203 |
| 9,179,359 B2* | 11/2015 | Raleigh | ............... | H04L 41/0893 |
| 2005/0091505 A1* | 4/2005 | Riley | ............... | H04L 12/5695 713/182 |
| 2005/0281397 A1* | 12/2005 | Hagale | ............... | H04L 12/581 379/88.22 |
| 2006/0222008 A1* | 10/2006 | Aaron | ............... | H04L 41/0896 370/468 |
| 2008/0148310 A1* | 6/2008 | Strickland | ............... | G06F 17/30867 725/30 |
| 2008/0244258 A1* | 10/2008 | Wright | ............... | G06F 9/44505 713/100 |
| 2009/0022292 A1* | 1/2009 | Beck | ............... | H04L 12/58 379/142.06 |
| 2009/0319613 A1* | 12/2009 | Hjelm | ............... | H04L 67/16 709/204 |
| 2010/0180040 A1* | 7/2010 | Friedman | ............... | H04L 63/10 709/229 |
| 2010/0188975 A1* | 7/2010 | Raleigh | ............... | 370/230.1 |
| 2010/0192170 A1* | 7/2010 | Raleigh | ............... | G06Q 10/06375 725/1 |
| 2010/0299236 A1* | 11/2010 | Cassell | ............... | G06Q 30/04 705/34 |
| 2011/0113471 A1* | 5/2011 | Hjelm | ............... | H04L 12/66 726/1 |
| 2011/0317717 A1* | 12/2011 | Scarborough | ............... | H04L 67/325 370/468 |
| 2011/0321122 A1* | 12/2011 | Mwangi | ............... | G06F 21/6245 726/1 |
| 2012/0076009 A1* | 3/2012 | Pasko | ............... | H04W 4/003 370/252 |
| 2012/0129557 A1* | 5/2012 | Niemoeller | ............... | G06F 9/5038 455/500 |
| 2012/0263036 A1* | 10/2012 | Barclay et al. | ............... | 370/230 |
| 2012/0265885 A1* | 10/2012 | Huslak | ............... | H04L 67/06 709/226 |
| 2012/0276867 A1* | 11/2012 | McNamee | ............... | H04L 12/1407 455/406 |
| 2013/0023232 A1* | 1/2013 | Mendiola | ............... | H04L 12/1432 455/406 |
| 2013/0031191 A1* | 1/2013 | Bott | ............... | G06F 21/552 709/206 |
| 2013/0138807 A1* | 5/2013 | Perkuhn | ............... | H04W 28/26 709/224 |
| 2013/0311667 A1* | 11/2013 | Payette | ............... | H04L 67/14 709/228 |
| 2014/0095706 A1* | 4/2014 | Raleigh | ............... | H04L 41/0893 709/224 |
| 2014/0160923 A1* | 6/2014 | Joy | ............... | H04W 28/0268 370/230 |
| 2015/0142934 A1* | 5/2015 | Craine | ............... | H04L 41/0806 709/221 |
| 2015/0163121 A1* | 6/2015 | Mahaffey | ............... | G06F 11/0766 707/687 |

* cited by examiner

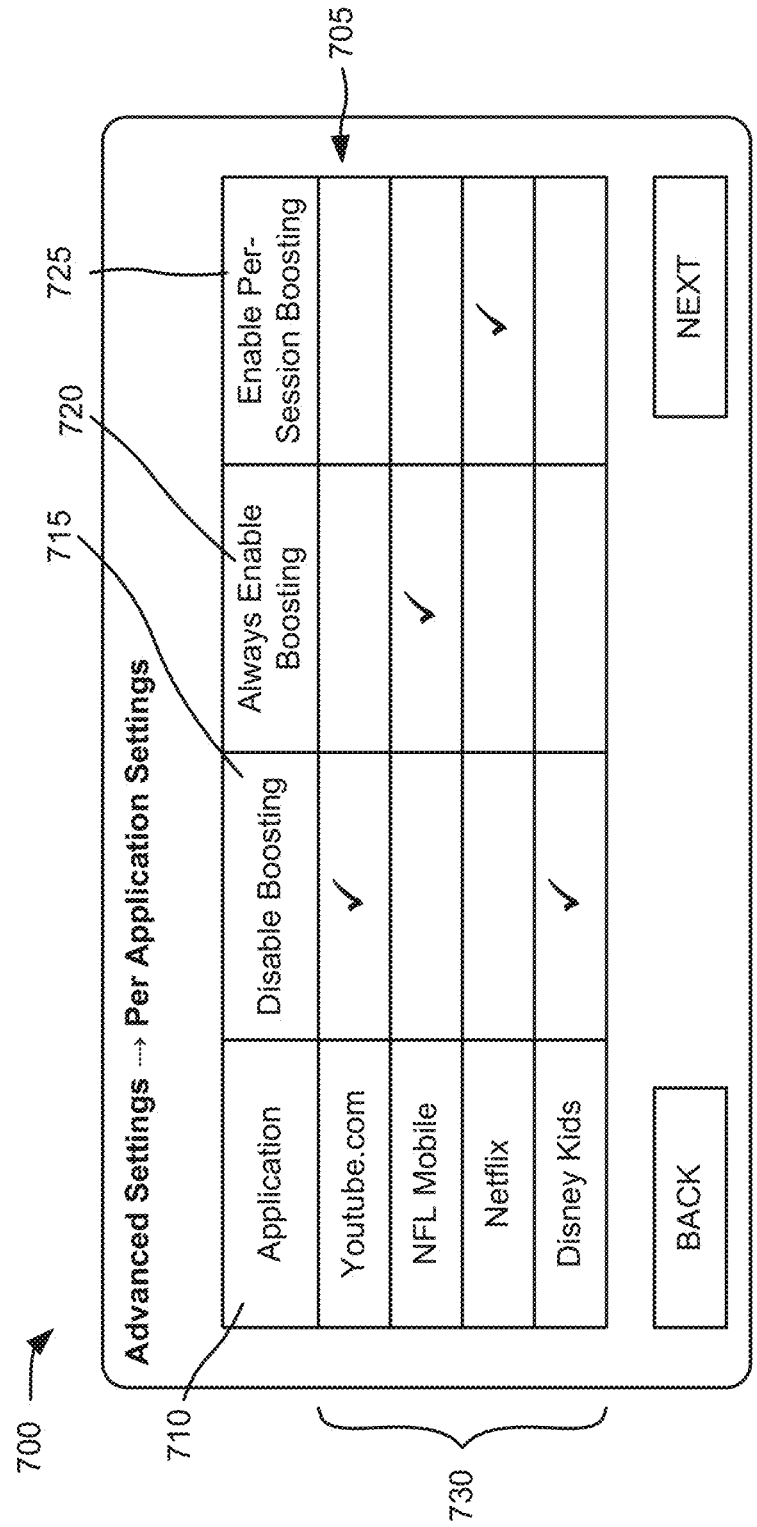

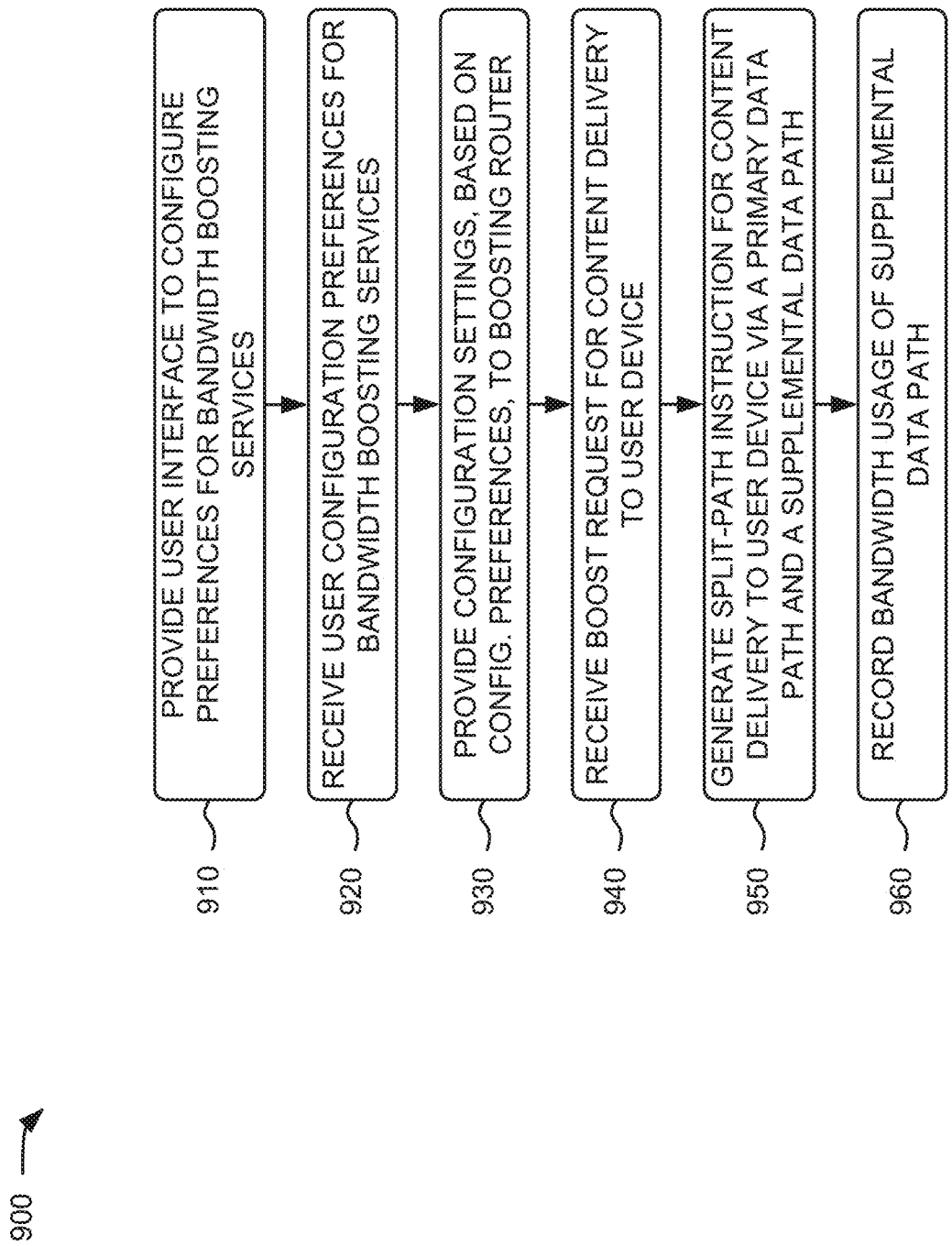

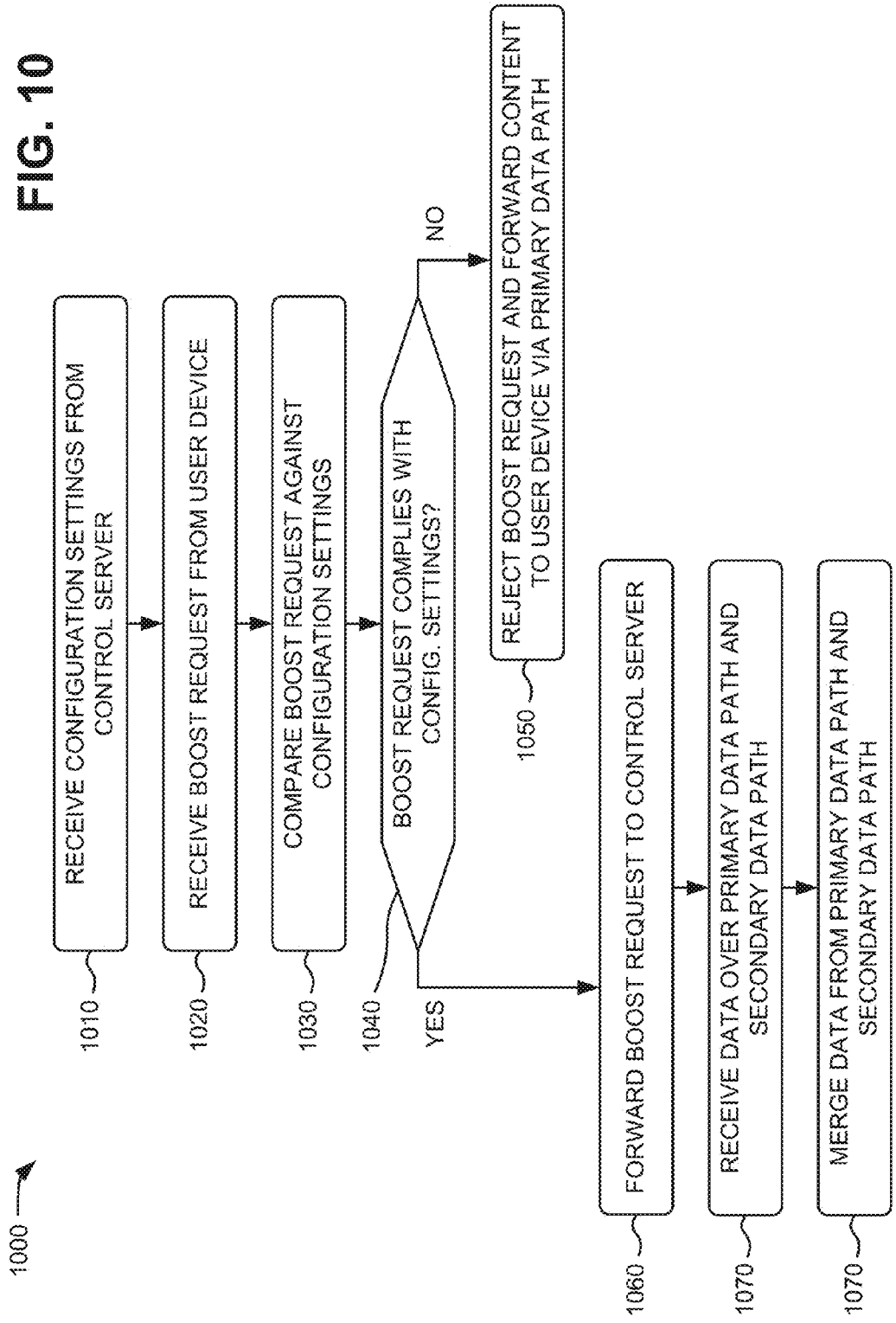

BANDWIDTH BOOSTING IN SHARED LOCAL NETWORKS

BACKGROUND

As high speed network access becomes increasingly accessible, more and more bandwidth-intensive applications are being made available to customers. Digital Subscriber Line (DSL) is a technology for bringing high-bandwidth digital information to homes and businesses over telephone lines. A DSL can simultaneously carry both data and voice signals. The data portion of the line may be continuously available to the user, making DSL an "always-on" connection. Special digital hardware attached to both ends of the line allows data transmission over the wires at relatively high bandwidths.

Other wireless services may provide high speed broadband access using wireless broadband equipment and/or other fixed wired or wireless technologies.

BRIEF DESCRIPTION OF THE DRAWINGS

FIGS. 7A and 7B are diagrams of exemplary configuration user interfaces that may be implemented by the web services module of FIG. 6, according to implementations described herein;

FIG. 9 is a flow diagram of an exemplary process for selectively providing bandwidth boosting services to user devices in a local subscriber network; and FIG. 10 is a flow diagram of an exemplary process for locally controlling bandwidth boosting services for user devices in a local subscriber network.

DETAILED DESCRIPTION OF PREFERRED EMBODIMENTS

The following detailed description refers to the accompanying drawings. The same reference numbers in different drawings may identify the same or similar elements.

Systems and methods described herein may enable subscribers with limited bandwidth capacity from a primary data path, such as a DSL or fiber connection, to receive supplemental bandwidth from another network connection, such a broadband cellular connection. While DSL or broadband services may provide adequate bandwidth for many applications, these services may not provide optimal performance for some bandwidth-intensive applications or for use by multiple devices simultaneously.

In implementations described herein, equipment on the subscriber's local network (e.g., a home network) may be configured to receive broadband service from multiple types of connections, including a primary data path, such as fiber or DSL connection, and a secondary data path, such as a broadband cellular connection. A remote server (e.g., a "control server") in a services provider's network may direct traffic flows between the primary data path and the secondary data path. Combining available broadband connections may provide for higher bandwidth speeds and increase reliability for subscribers. According to implementations described herein, controls and account settings may be managed to optimize bandwidth aggregation among multiple devices in a shared network, such as a home network. In one implementation, an account administrator for a home network may configure parental controls, application settings, notifications, billing interfaces, authorizations, tracking, throttling/capping, and usage statistics for bandwidth aggregation of multiple devices and/or users associated with an account.

While systems and/or methods are described herein primarily in the context of boosting services for a primary DSL connection, in other implementations, the systems and/or methods described here may be applied to boost other network provider services, such as broadband services using copper cable, fiber optic, or wireless network equipment.

Figure 1:
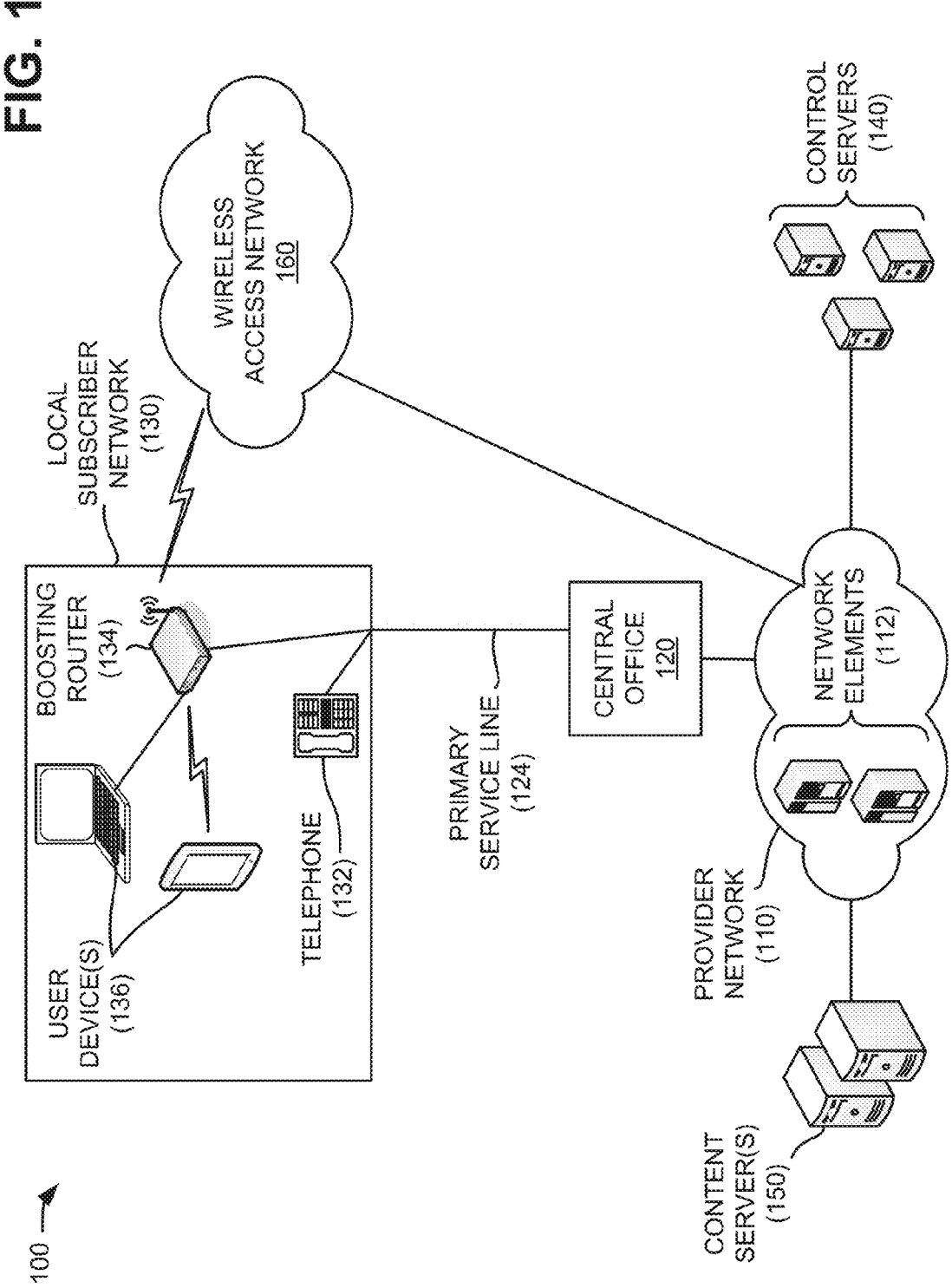
FIG. 1 is an exemplary network environment in which systems and/or methods described herein may be implemented.

FIG. 1 is a diagram of an exemplary network environment 100 in which systems and/or methods described herein may be implemented. As illustrated, environment 100 may include a provider network 110, a central office 120, a local subscriber network 130, control servers 140, content servers 150, and a wireless access network 160. Components of environment 100 may interconnect via wired and/or wireless connections. The networks and devices of network environment 100 have been illustrated in FIG. 1 for simplicity. In practice, there may be more provider networks 110, central offices 120, local subscriber networks 130, control servers 140, data servers 150, and/or wireless access networks 160. Also, in some instances, one or more of the components of environment 100 may perform one or more functions described as being performed by another one or more of the components of environment 100.

Provider network 110 may include one or more interconnected networks of various different types to transport data. For example, provider network 110 may include one or more of a LAN, a WAN, a cellular network, a satellite network, a broadcast TV-based network, the Internet, a private WAN, or a combination of the Internet and a private WAN, that is used to transport data. Provider network 110 may include a number of separate networks that function to provide services to local subscriber network 130. In one implementation, provider network 110 may be a network that provides voice and data services to local subscriber network 130. Provider network 110 may include a high capacity data backbone associated with the service provider. For instance, provider network 110 may include a circuit-switched telephone network and a packet-based data network. Network 110 may be connected, through central office 120 and/or wireless access network 160, to local subscriber network 130.

Provider network 110 may include a number of network elements 112. Each of network elements 112 may include a data transfer device, such as a gateway, a router, a switch (e.g., an asynchronous transfer mode (ATM) switch), a firewall, a network interface card (NIC), a hub, a bridge, a proxy server, an optical add-drop multiplexer (OADM), a line access multiplexer (LAM), a permanent or private virtual circuit (PVC), links provided between any of the aforementioned devices, or some other type of device that processes and/or transfers data. In one example, one or more network elements 112 may be capable of establishing an end-to-end path between local subscriber network 130 and content server 150.

Central office 120 may represent a physical location, generally controlled by the service provider, through which local subscriber network 130 can connect to provider network 110. A primary service line 124 may provide broadband access from central office 120 to local subscriber network 130. Central office 120 may include one or more devices to aggregate communication from multiple subscriber premises. For example, central office 120 may include a digital subscriber line access multiplexer (DSLAM) to connect multiple lines (i.e., primary service lines 124 from multiple local subscriber networks 130 using DSL) to provider network 110. Depending on its device architecture and setup, central office 120 may aggregate primary service lines 124 over Asynchronous Transfer Mode (ATM), frame relay, and/or an Internet Protocol network.

Local subscriber network 130 may represent a local area network (LAN or a home network) of a subscriber to services offered by the service provider of provider network 110. Local subscriber network 130 may connect to provider network 110 via central office 120 and primary service line 124. As described further herein, one or more devices in local subscriber network 130 may also connect to provider network 110 via wireless access network 160. Local subscriber network 130 may include, for example, one or more telephones 132, a boosting router 134, and one or more user devices 136. Telephones 132, boosting router 134, and user devices 136 may be referred to individually and/or generically as "customer premises equipment" or as a "subscriber device." Telephone 132 may include an analog phone through which a user may place and receive calls.

Boosting router 134 may include a device that may provide connectivity between network 110 and one or more components of local subscriber network 130 (e.g., user devices 136). Boosting router 134 may provide a data connection to user devices 136 via, for example, an Ethernet, a Universal Serial Bus (USB), and/or a wireless connection. Boosting router 134 may receive information from network 110 for transmission within local subscriber network 130, and/or receive information from within local subscriber network 130 for transmission to network 110. Boosting router 134 may also provide firewall functionality for local subscriber network 130, such as packet filtering and protection against network attacks.

In one implementation, boosting router 134 may include a gateway broadband home router (BHR). For example, boosting router 134 may include a DSL modem to modulate high frequency tones for transmission to central office 120 (e.g., including a digital subscriber line access multiplexer). The DSL modem may correspondingly receive and demodulate signals from central office 120. In some cases, boosting router 134 may be supplied by the service provider as customer premises equipment (CPE). In implementations described herein, boosting router 134 may be configured to simultaneously participate in multiple wireless networks. Boosting router 134 is described further in connection with, for example, FIG. 5.

User device 136 may include a computing or communication device, such as a tablet computer, an internet television, a personal computer, a laptop computer, a personal digital assistant (PDA) (e.g., that can include a radiotelephone, a pager, Internet/intranet access, etc.), a smart phone, a gaming system, or another device. Multiple user devices 136 at a single subscriber premise may connect to boosting router 134, either directly or through a local switching or routing device. In some implementations, user device 136 may include multiple forms of network connectivity, such as an Ethernet connection, wireless LAN equipment, a wireless broadband card, etc. In an implementation, user device 136 may detect high bandwidth demands and initiate a request for supplemental bandwidth.

Control servers 140 may include computing devices or network devices that provide control plane functionality to direct data flows to local subscriber network 130 (e.g., user devices 136). For example, as described further herein, control servers 140 may receive a request, from local subscriber network 130, for additional network bandwidth and direct a supplemental data flow to local subscriber network 130 via wireless access network 160. In one implementation, control server 140 may be associated with a service provider that provides primary network connectivity (e.g., DSL, broadband, etc.) to local subscriber network 130. In other implementations, control server 140 may be associated a provider of both primary network connectivity and wireless access network 160. In still another implementation, control server 140 may be associated with a third party (e.g., that provides an overlay service for the primary service provider). Control server 140 is described further in connection with, for example, FIG. 6.

Content server 150 may include one or more server devices, or other types of computation or communication devices, that gather, process, search, and/or provide information in a manner described herein. In one implementation, content server 150 may include a computer system, an application, and/or a broadcasting device. Content server 150 may include, for example, IP content distribution facilities (e.g., IPTV). In one implementation, content server 150 may provide multimedia content that can be presented to a user on user device 136.

Wireless access network 160 may correspond to a Long Term Evolution (LTE) access network or another broadband cellular network. Wireless access network 160 may include one or more devices that implement logical entities interconnected via standardized interfaces, and that provide wireless packet-switched services and wireless IP connectivity to boosting router 134 and/or user devices 136 for both data and voice services. Wireless access network 160 may include a base station or eNodeB, a mobility management entity (MME), a serving gateway (SGW), a packet data network gateway (PGW), a home subscriber server (HSS), and other network devices. While implementations herein are described primarily in the context of wireless access network 160 providing broadband services via LTE, other wireless protocols may be used. For example, components conforming to LTE standards described herein may be replaced by components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.).

Although FIG. 1 shows example components of network environment 100, in other implementations, network environment 100 may include fewer components, different components, differently arranged components, or additional components than depicted in FIG. 1.

Figure 2:
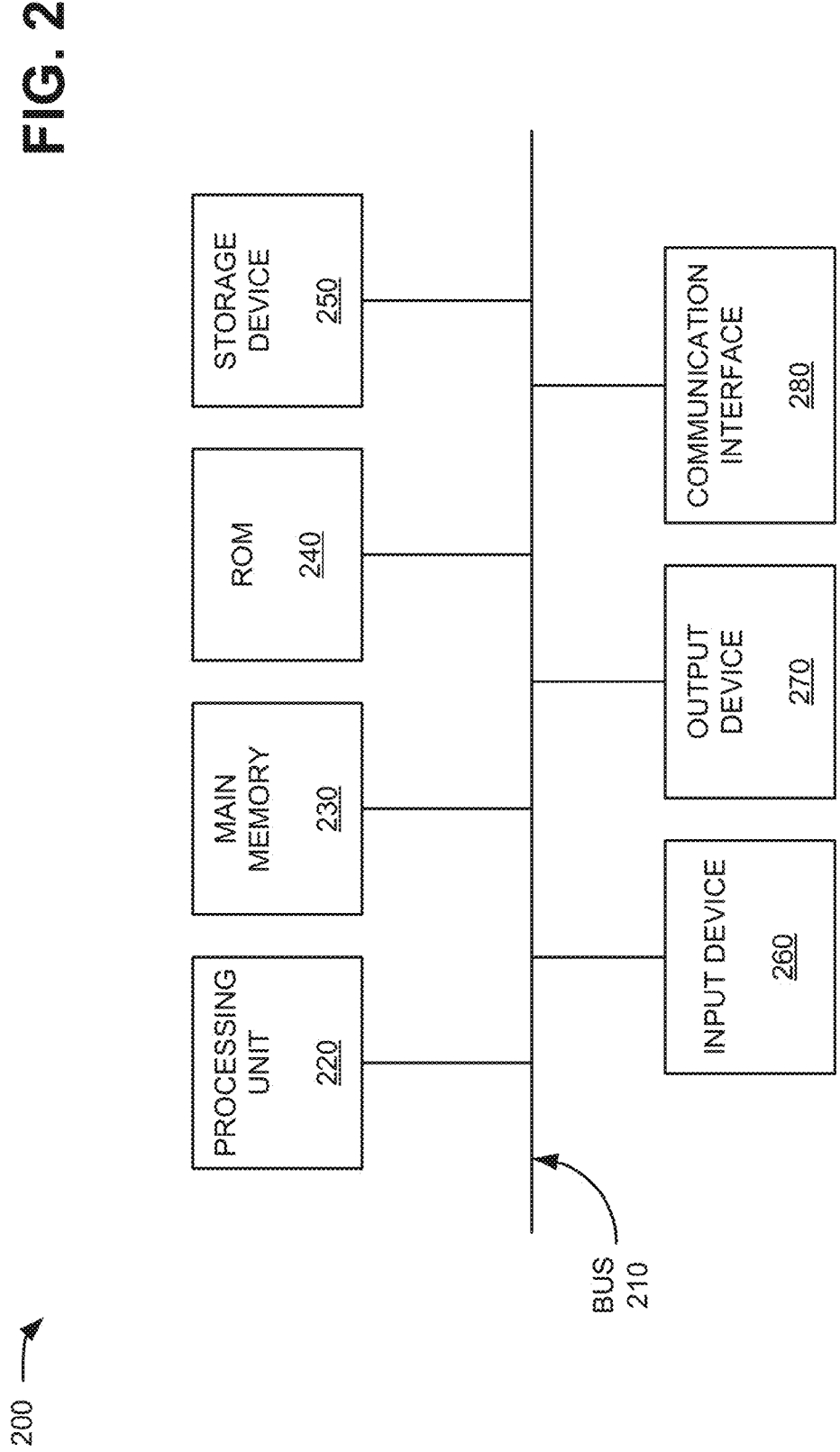
FIG. 2 is a block diagram of exemplary components of a device that may correspond to one of the devices of the network of FIG. 1.

FIG. 2 is a block diagram of an exemplary computing device 200, which may correspond to one or more of boosting router 134, user device 136, control server 140, content server 150, or devices in provider network 110 or wireless access network 160. As illustrated, computing device 200 may include a bus 210, a processing unit 220, a main memory 230, a read only memory (ROM) 240, a storage device 250, an input device 260, an output device 270, and a communication interface 280. Bus 210 may include a path that permits communication among the elements of computing device 200.

Processing unit 220 may include one or more processors, microprocessors, and/or other types of processing devices that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to computing device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables computing device 200 to communicate with other devices and/or systems. For example, communication interface 280 may include mechanisms for communicating with another device or system via a network, such as network 110. In implementations in which computing device 200 represents a server (e.g., one of control servers 140) or network device, input device 260 and output device 270 may not be used. That is, the server may be a "headless" computing device.

As described herein, device 200 may perform certain operations in response to processing unit 220 executing software instructions contained in a computer-readable medium, such as memory 230. A computer-readable medium may be described as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
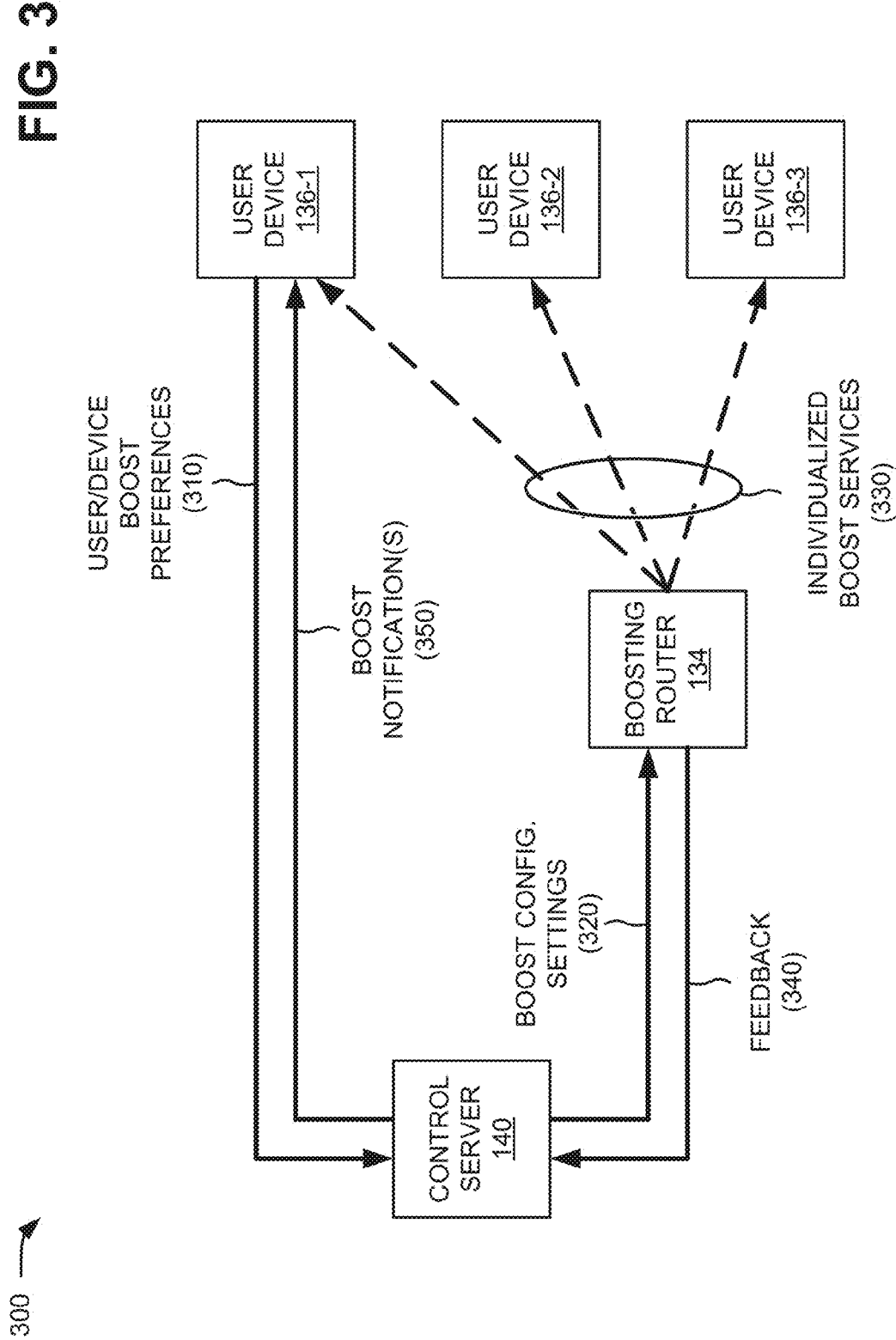
FIG. 3 is a diagram of exemplary configuration operations capable of being performed by a portion of the network depicted in FIG. 1.

FIG. 3 is a diagram of exemplary operations capable of being performed by a portion 300 of network environment 100 to configure bandwidth boosting for a local network. As shown, network portion 300 may include boosting router 134, multiple user devices 136-1, 136-2, and 136-3, and control server 140. Boosting router 134, user devices 136, and control server 140 may include the features described above in connection with one or more of FIGS. 1 and 2.

As shown in FIG. 3, user device 136-1 may provide user and/or device boost preferences 310 to control server 140. User and/or device boost preferences 310 may identify an account administrator for bandwidth boosting services in a home network (e.g., a home network associated with local subscriber network 130) and may configure settings for particular users and/or devices for the account. For example, user and/or device boost preferences 310 may include device and/or user permissions, parental control settings, rate limiting for particular applications and/or devices, or other preferences.

Device and/or user permissions of user and/or device boost preferences 310 may include registration information for particular users associated with the home network or particular devices associated with the home network. For example, permission may be provided on an individual basis for users to access bandwidth boosting services. Users may be identified, for example, using an account name. Additionally or alternatively, particular user devices 136 within the home network may be granted access and/or priority for bandwidth boosting services. For example, a high definition internet television may be granted priority to additional bandwidth over (or in place of) a child's tablet device. Devices may be identified, for example, using a MAC address or another unique identifier.

Parental control settings of user and/or device boost preferences 310 may include controls to restrict bandwidth boosting services of a specific application (e.g., a streaming video application) or to a specific user. For example, parental control settings may limit the amount of supplemental bandwidth (e.g., from a cellular broadband service) that may be used per billing cycle. Parental controls may also restrict times of use or other access to bandwidth boosting services. In one implementation, bandwidth boosting services for particular applications may be always enabled, always disabled, or selectively enabled. In another implementation, bandwidth boosting services for particular devices may be always enabled, always disabled, or selectively enabled.

Rate limiting for user and/or device boost preferences 310 may include setting for particular devices and/or applications. For example, bandwidth throttling may be applied to throughput for particular devices or accounts. Each user account can be limited to a specific download speed or volume to mitigate excessive background download volumes. Such throttling may limit the likelihood of downloading an entire movie when the user may stop watching after a few minutes. Rate limiting for user and/or device boost preferences 310 may also include a volume ceiling or cap that can be applied across all account users/devices. For example, rate limits may be configured for a total volume across all users/devices based on a per day limit. Limits may also be applied per user, per site (e.g., web site), per application, and/or per device.

User device 136-1 may represent a device controlled/operated by an account administrator for the home network. Access to provide user and/or device boost preferences 310 may be restricted, for example, using a user account name and password or other credentials. In one implementation, user and/or device boost preferences 310 may be submitted via a user application (or "app") that may be downloaded to user device 136-1. In another implementation, user and/or device boost preferences 310 may be submitted to control server 140 via a web browser interface accessed using user device 136-1 or any other user device.

Control server 140 may receive user and/or device boost preferences 310 and convert user and/or device boost preferences 310 to boost configuration settings 320 that can be interpreted and enforced by boosting router 134. Control sever 140 may then provide boost configuration settings 320 to boosting router 134 for enforcement.

Based on boost configuration settings 320, boosting router 134 may provide individualized boost services 330 to particular user devices 136 in local subscriber network 130. Application of bandwidth boosting services is described further in connection with FIG. 4.

In one implementation, boosting router 134 may monitor bandwidth (e.g., supplemental bandwidth from a cellular broadband service) usage and provide feedback 340 to control server 140 when the bandwidth amounts reach or approach particular thresholds identified in boost configuration settings 320. In another implementation, control server 140 may monitor bandwidth usage.

Based on feedback 340 and/or monitoring by control server 140, control server 140 may provide one or more boost notifications 350 to user device 136-1 (or another device used by the account administrator). In one implementation, boost notifications 350 may include a notification that a ceiling threshold has been met. Boost notifications 350 may be provided, for example, via a text message or email to the account administrator. In another implementation, boost notifications 350 may also be provided (e.g., via boosting router 134) to all connected user devices 136 associated with the home network.

Although FIG. 3 shows exemplary components of network portion 300, in other implementations, network portion 300 may include fewer components, different components, differently-arranged components, or additional components than depicted in FIG. 3. Alternatively, or additionally, one or more components of network portion 300 may perform one or more other tasks described as being performed by one or more other components of network portion 300.

Figure 4:
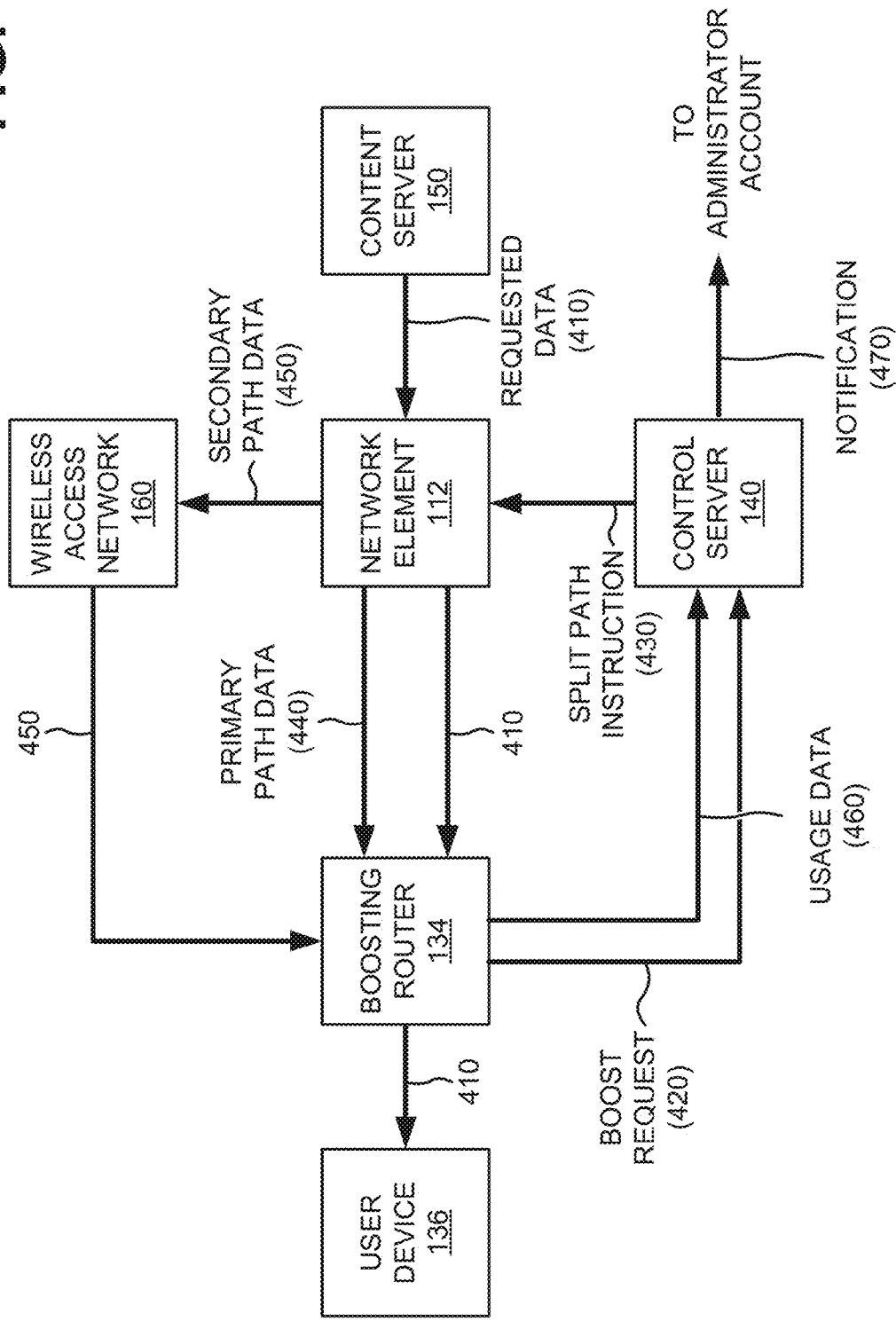
FIG. 4 is a diagram of exemplary content delivery operations capable of being performed by another portion of the network depicted in FIG. 1.

FIG. 4 is a diagram of exemplary content delivery operations capable of being performed by another portion 400 of the network environment 100. As shown, network portion 400 may include network element 112, boosting router 134, user devices 136, control server 140, content server 150, and wireless access network 160. Network element 112, boosting router 134, user devices 136, control server 140, content server 150, and wireless access network 160 may include the features described above in connection with one or more of FIGS. 1-3.

Referring to FIG. 4, content server 150, based on a previous request (not shown) from user device 136, may send requested data 410 toward user device 136. Requested data 410 may include, for example, a high bandwidth data flow, such as high-definition streaming video, an on-line game, a large file download, etc. Requested data 410 may pass through network element 112 to boosting router 134 (e.g., via central office 120, not shown).

Boosting router 134 may detect high bandwidth usage (e.g., bandwidth at or approaching the available bandwidth capacity of primary service line 124 of FIG. 1) while receiving requested data 410. In response to the detection of the high bandwidth usage, boosting router 134 may review stored boosting criteria (e.g., boost configuration settings 320) to determine if user device 136 may be eligible for bandwidth boosting services as applied to requested data 410. More particularly, boosting router 134 may determine if the particular device, content source, time, or other conditions (e.g., other users, user/device priority, etc.) permit application of bandwidth boosting services. Assuming boosting router 134 determines that bandwidth boosting services can be used for requested data 410, boosting router 134 may send a boost request 420 to control server 140 to request additional network bandwidth via a wireless network (e.g., wireless access network 160). Boost request 420 may include, for example, an identifier for boosting router 134 (e.g., an IP address, a serial number, etc.), source information for content server 150, TCP/IP session information, an estimated duration for the requested boost, a requested supplemental bandwidth amount, information about requested data 410, etc.

Control server 140 may receive boost request 420 from boosting router 134 (e.g., via network element(s) 112). In one implementation, control server 140 may verify that boost request 420 is valid (e.g., is within the bounds of user/device boost preferences 310 and permitted with the particular subscriber account) and determine if a wireless access network 160 has sufficient bandwidth to provide supplemental bandwidth (e.g., based on availability indications from a local eNodeB serving the area of local subscriber network 130). If bandwidth in wireless access network 160 is available, control server 140 may provide a split-path instruction 430 to network element 112 (and/or other network elements of network 110) to route portions of the requested data 410 from content server 150 over separate paths that include primary service line 124 and wireless access network 160.

Network element 112 may receive the split-path instruction and route requested data 410 to boosting router 134 over a primary path 440 and a secondary path 450. Primary data path 440 may go through the subscriber's primary service line (e.g., primary service line 124), while secondary data path 450 may go through wireless access network 160. In one implementation, network element 112 may encrypt data over secondary data path 450. The amount of traffic distributed over primary data path 440 and secondary data path 450 may be determined by control server 140 based on one or more of a bandwidth value included in boost request 420, an available bandwidth of primary data path 440, and available bandwidth of secondary data path 450, a subscription agreement, and/or other factors.

Boosting router 134 may receive requested data 410 via both primary data path 440 and secondary data path 450, may decrypt any encrypted data, may merge the data, and may forward the data received via the two paths to user device 136 as requested data 410 via a single data stream. In one implementation, boosting router 134 may order traffic (e.g., packets) from primary data path 440 and secondary data path 450 to minimize dropped packets and/or other delays. For example, boosting router 134, network element 112, control server 140, and/or wireless access network 160 may implement a protocol to allow boosting router 134 to sort traffic from primary data path 440 and secondary data path 450 prior to passing the data to user device 136 as requested data 410.

As further shown in FIG. 4, boosting router 134 may provide usage data 460 to control server. For example, boosting router 134 may track the amount of data and/or bandwidth received via secondary path 450, which may represent data from a capped wireless data plan. In one implementation, boosting router may compare tracked data to one or more stored thresholds, such as overall data plan thresholds or other thresholds identified by boost configuration settings 320 (FIG. 3). Thus, usage data 460 may be provided when a threshold is reached and/or on a periodic basis. Control server 140 may receive usage data 460 and, if necessary, may generate a notification 470 (e.g., an email, text message, or pop-up in an ongoing session for the bandwidth boosting service) to an administrator account. Notification 470 may indicate, for example, that a data threshold has been reached. In one implementation, notification 470 may request user (e.g., administrator) input to exceed the data threshold.

Although FIG. 4 shows exemplary components of network portion 400, in other implementations, network portion 400 may include fewer components, different components, differently arranged components, or additional components than depicted in FIG. 4. Alternatively, or additionally, one or more components of network portion 400 may perform one or more other tasks described as being performed by one or more other components of network portion 400.

Figure 5:
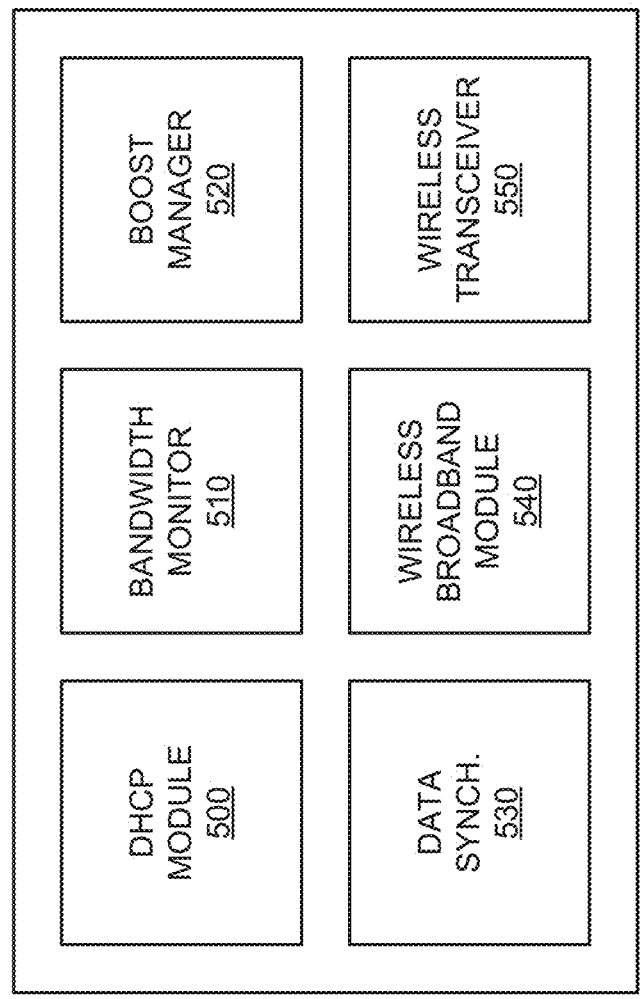
FIG. 5 is a block diagram of exemplary functional components of the boosting router of FIG. 1.

FIG. 5 is a diagram of exemplary functional components of boosting router 134. In one implementation, the function of components described in connection with FIG. 5 may be implemented by one or more components of device 200 illustrated in FIG. 2. Also, in other implementations, functional components described herein in connection with boosting router 134 may by distributed between boosting router 134 and user device 136 and/or exclusively included within user device 136. As shown in FIG. 5, boosting router 134 may include a Dynamic Host Configuration Protocol (DHCP) module 500, a bandwidth monitor 510, a boost manager 520, a data synchronizer 530, a wireless broadband module 540, and a wireless transceiver 550.

DHCP module 500 may provide DHCP services for devices in local subscriber network 130. DHCP module 500 may have one or more WAN IP addresses for communications with provider network 110 and/or wireless access network 160. DHCP module 500 may also allocate dynamic IP addresses to user devices 136 in local subscriber network 130.

Bandwidth monitor 510 may determine if traffic conditions exist that may benefit from supplemental bandwidth. For example, bandwidth monitor 510 may monitor traffic over primary service line 124 to determine if traffic conditions are above a particular usage threshold (e.g., 80% of basic DSL or broadband capacity) or if a particular data request may cause traffic to exceed a usage threshold. In another implementation, bandwidth monitor 510 may detect a particular traffic type (e.g., a video stream), based on packet header data, that may be indicative of a need for supplemental bandwidth capacity. Bandwidth monitor 510 may also monitor supplemented traffic from primary service line 124 (e.g., primary data path 440 of FIG. 4) and from wireless access network 160 (e.g., secondary data path 450 of FIG. 4) to determine if traffic conditions drop below a particular usage threshold (e.g., 80% of basic DSL or broadband capacity). In another implementation, bandwidth monitor 510 may track bandwidth use of limited resources (e.g., a capped wireless data plan for wireless access network 160). For example, bandwidth monitor 510 may identify when a supplemental bandwidth limit (e.g., a threshold percentage of a total wireless plan amount) has been reached.

Boost manager 520 may request and implement a supplemental bandwidth capacity for a local router (e.g., boosting router 134). In one implementation, boost manager 520 may send a boost request signal (e.g., boost request 420) to control server 140 based on, for example, indications from bandwidth monitor 510 that incoming traffic conditions are above a particular usage threshold. In another implementation, boost manager 520 may send a boost request signal (e.g., boost request 420) when a request or login is received from a particular user device 136. Boost manager 520 may send a boost cancel request to control server 140 when bandwidth monitor 510 indicates that supplemented incoming traffic drops below a particular usage threshold, when a supplemental data limit is reached, when canceled by user device 136, etc.

Data synchronizer 530 may combine (or multiplex) incoming traffic (e.g., packets) from primary data path 440 and secondary data path 450 to minimize dropped packets and/or other delays. For example, data synchronizer 530 may include protocols to manage flow/sequencing of data from wireless access network 160 (e.g., received via secondary data path 450 of FIG. 4) and data from primary service line 124 (e.g., received via primary data path 440 of FIG. 4). Thus, data synchronizer 530 may reduce sequencing/buffering requirements for user device 136.

Wireless broadband module 540 may process wireless signals from wireless access network 160. For example, wireless broadband module 540 may perform de-modulation, de-interleaving, equalization, filtering, de-coding, channel estimation, estimations related to signal-to-noise (SN), estimations related to signal-to-interference-to-noise (SIN), estimations related to channel fading, error control, and/or other types of processing related to receiving wireless signals. Wireless broadband module 540 may be capable of operating with, for example, LTE, GSM, WCDMA, UMB, UMTS, CDMA2000, HSPA, WiMax, Wi-Fi or other protocols.

Wireless transceiver 550 may to send signals to and/or receive signals from user device 136. For example, wireless transceiver 550 may receive signals from boost manager 520, data synchronizer 530, and/or wireless broadband module 540 and transmit the signals to user device 136 via a wireless interface, such as a Wi-Fi interface. Also, wireless transceiver 550 may receive signals from user device 136 via the wireless interface and provide the signals to, for example, boost manager 520, data synchronizer 530, and/or wireless broadband module 540.

Although FIG. 5 shows exemplary functional components of boosting router 134, in other implementations, boosting router 134 may include fewer functional components, different functional components, differently arranged functional components, or additional functional components than depicted in FIG. 5. Alternatively, or additionally, one or more functional components of boosting router 134 may perform one or more other tasks described as being performed by one or more other functional components of boosting router 134.

Figure 6:
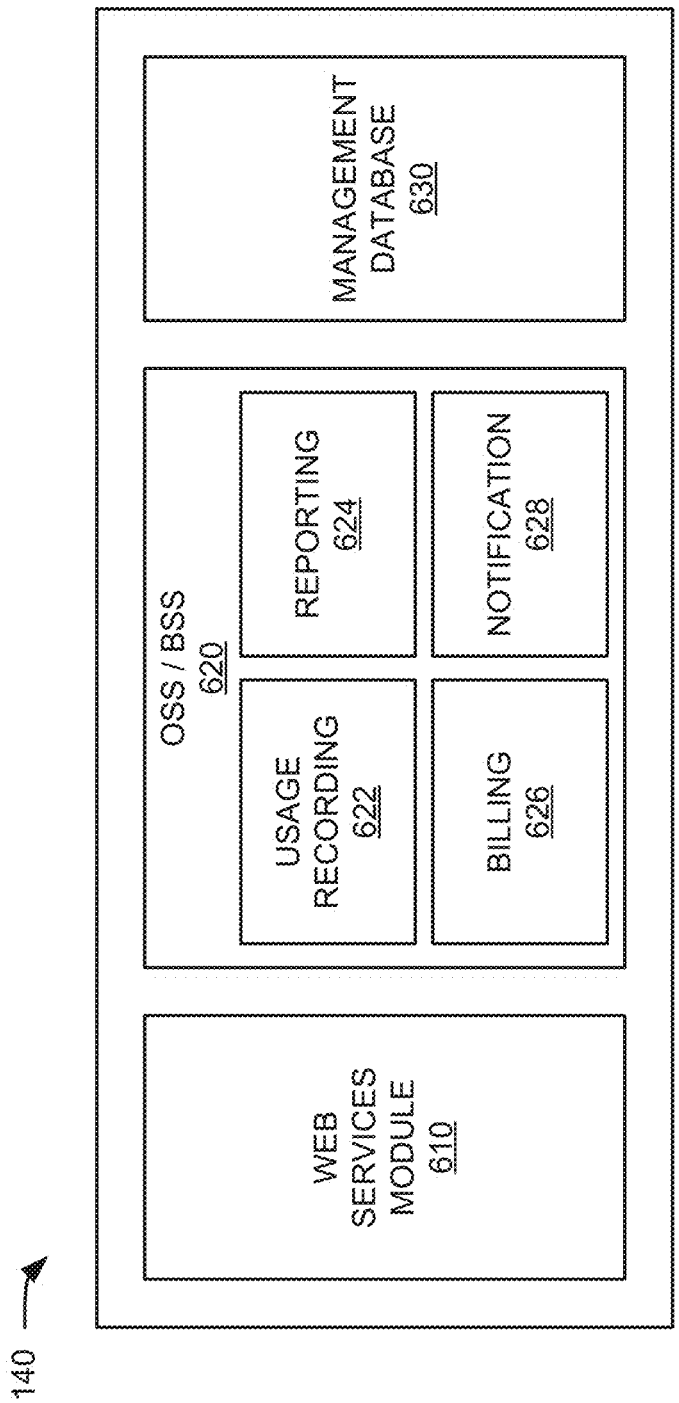
FIG. 6 is a block diagram of exemplary functional components of the control server of FIG. 1.

FIG. 6 is a diagram of exemplary functional components of control server 140. In one implementation, the function of components described in connection with FIG. 6 may be implemented by one or more components of device 200 (FIG. 2). As shown in FIG. 6, control server 140 may include a web services module 610, an operations support system (OSS)/business support system (BSS) 620, and a management database 630.

Web services module 610 may include a network device, a web server, or another device or group of devices that present a user interface for configuring bandwidth boosting services. In one implementation, web services module 610 may provide a vehicle for a user to register for an account and provide a wireless number (e.g., associated with the subscriber account for wireless access network 160) used to purchase the bandwidth boosting services and be prompted via a self-guided wizard to create an account. For example, boosting router 134 may automatically connect user device 136 to web services module 610 when boosting router 134 is initially powered on and connected to provider network 110.

Web services module 610 may also solicit registration for each user device 136 that is to be considered for use with the bandwidth boosting services. The registration information may include, for example, a media access control (MAC) ID or another unique identifier, to identify eligible devices. The registration information may be used, for example, by other components to track usage on the device level and understand more about video optimization down to the device and across different devices.

Figure 7B:
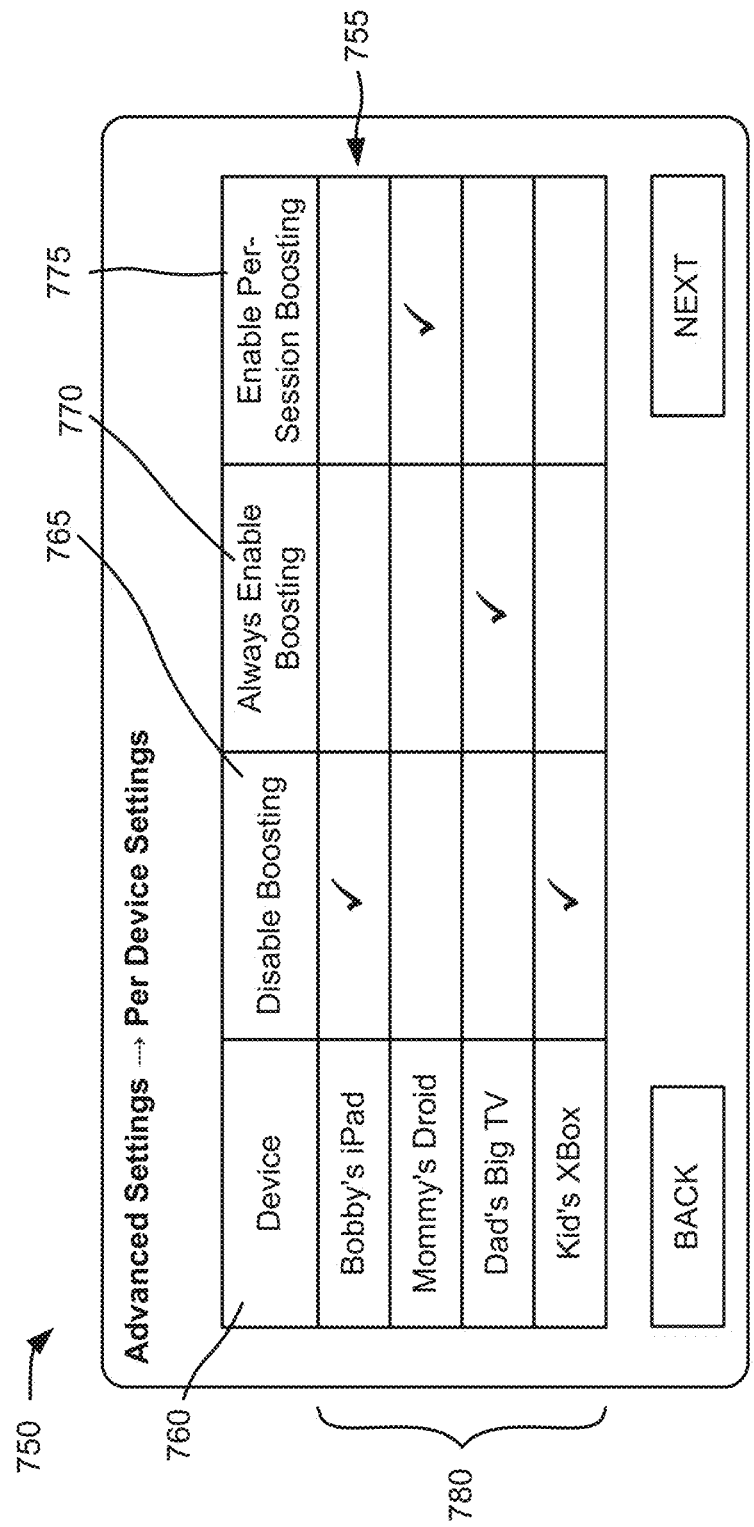

Once registered, web services module 610 may provide a user interface to enable the subscriber to assign user permissions, caps/thresholds, throttles, notifications, etc. per user device and per user depending on preference. For example, web services module 610 may provide an interface for an account administrator to provide user/device boost preferences 310 and/or receive boost notifications 350. In one implementation, subscribers may be given a choice to use or not use bandwidth boosting services, depending on the specific application being experienced as well as total usage on a wireless plan and any financial impacts incurred from additional cellular usage. Web services module 610 may allow users (e.g., an account administrator) to set authentication requirements for the bandwidth boosting services or choose to turn the bandwidth boosting services on or off. Configurations may set at the device level and at the application level, set statically and configured only when changed, or configuration options could be presented each time the bandwidth boosting service is to be invoked. FIGS. 7A and 7B, described below, depict exemplary user interfaces that may be used to provide configuration settings.

Figure 8A:
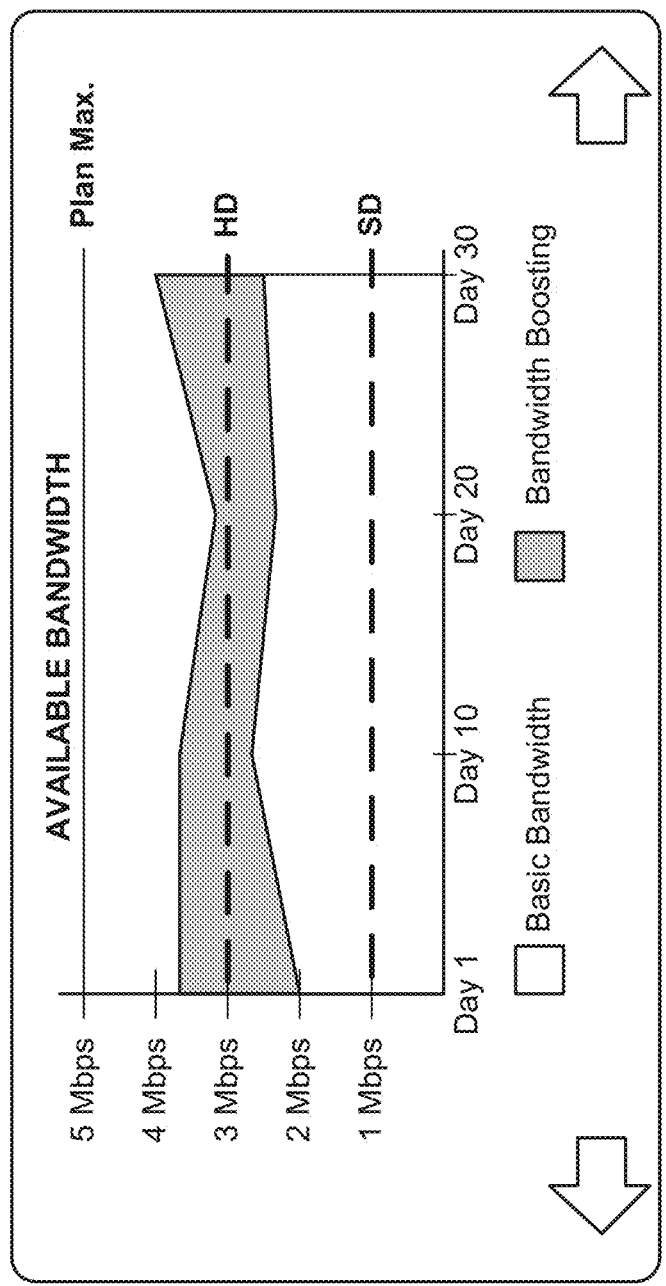
FIGS. 8A and 8B are diagrams of exemplary reporting user interfaces that may be implemented by the web services module of FIG. 6, according to implementations described herein.
Figure 8B:
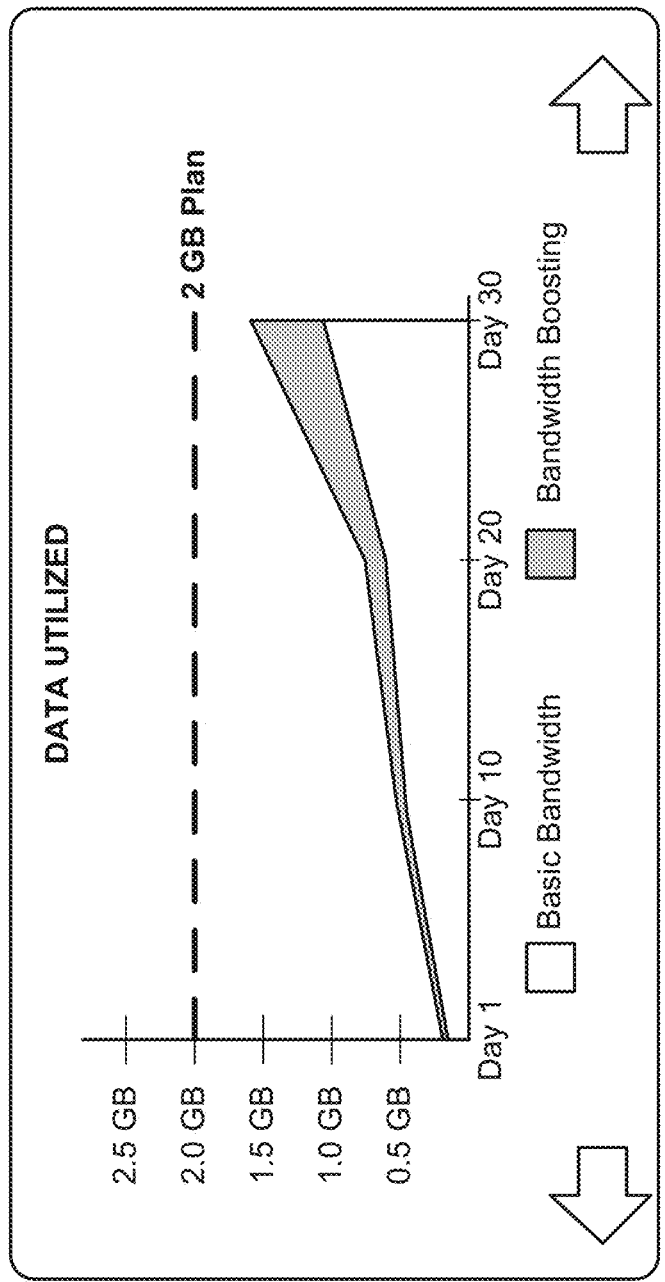

In another implementation, web services module 610 may allow users to track bandwidth and/or data use for a current or past billing cycle. Thus, web services module 610 may provide an indication of how much bandwidth went unused in a previous billing cycle, how much the unused bandwidth may have been used to enhance a user's experience, and/or how much bandwidth/data is available for future use. FIGS. 8A and 8B, described below, depict reports that may be presented to a user via web services module 610, for example.

OSS/BSS module 620 may generally provide operation and business function support services for the bandwidth boosting services. OSS/BSS module 620 may include a usage recording unit 622, a reporting unit 624, a billing unit 626, and a notification unit 628.

Usage recording unit 622 may track usage of bandwidth for wireless access network 160 on a per-account, per-device, and/or per-user basis. In one implementation, usage recording unit 622 may receive feedback from boosting router 134 (e.g., bandwidth monitor 510). In another implementation, usage recording unit 622 may receive bandwidth usage information from one or more components of wireless access network 160.

Reporting unit 624 may collect usage statistics from usage recording unit 622 and generate reports based on, for example, wireless account limits and/or configurations for the bandwidth boosting services. In one implementation, reporting unit 624 may generate reports in response to user requests via web services module 610. In another implementation, reporting unit 624 may generate reports on a period cycle (e.g., monthly, etc.). Reports may include, for example, actual usage, projected usage, and/or business cases for addition use.

Billing unit 626 may manage charging users for bandwidth boosting services. In one implementation, billing unit may interface with one or more billing systems for provider network 110 to associate wireless bandwidth consumption for the bandwidth boosting services with other wireless service charges.

Notification unit 628 may manage notifications to account administrators and/or users regarding the bandwidth boosting services. For example, notification unit 628 may generate notifications to account administrators and/or users when wireless bandwidth consumption for a particular account, user, or device reaches a configured threshold. In an exemplary implementation, notification unit 628 may monitor bandwidth consumption over secondary data path 450, compare the monitored bandwidth consumption against a data plan threshold associated with a subscriber's account, and send a notification to an account administrator (or another user) when the monitored bandwidth consumption reaches the data plan threshold. Notification unit 628 may provide notices in accordance with configured settings. For example, notification unit 628 may provide notifications to particular accounts (e.g., an email account, a text messaging account, etc.) indicated in user/device boost preferences 310.

Still referring to FIG. 6, management database 630 may store information for use by web services module 610 and OSS/BSS 260. For example, management database 630 may store user/device boost preferences 310, usage data (e.g., from usage recording unit 622), account information, etc.

Although FIG. 6 shows example functional components of control server 140, in other implementations, control server 140 may include fewer functional components, different functional components, differently arranged functional components, or additional functional components than depicted in FIG. 6. For example, some functions of web services module 610 may be performed by a local bandwidth boost application on user device 136. Alternatively, or additionally, one or more functional components of control server 140 may perform one or more other tasks described as being performed by one or more other functional components of control server 140.

FIGS. 7A and 7B depict exemplary user interfaces 700/750 that may be presented to a user (e.g., on user device 136). In one implementation, user interfaces 700/750 may be provided via control server 140 (e.g., web services module 610). In another implementation, user interfaces 700/750 may be included within a bandwidth boosting application, resident on user device 136, for the bandwidth boosting services.

Referring to FIG. 7A, user interface 700 illustrates an advanced settings interface for an account administrator to configure settings for bandwidth boosting services on a per-application basis. As shown in FIG. 7A, user interface 700 may include a table 705 that further includes an application column 710, a disable boosting column 715, an always enable boosting column 720, an enable per-session boosting column 725, and a variety of entries 730 for columns 710 through 725.

Application column 710 may include a list of applications available on registered user devices 136. In one implementation, applications in application column 710 may be populated by web services module 610 or user device 136 based on configuration files for each registered user device. In another implementation, applications in application column 710 may be entered by a user (e.g., an account administrator) individually.

Disable boosting column 715 may indicate an option to disable bandwidth boosting services associated with a particular application (e.g., corresponding to an application in application column 710). For example, selection of disable boosting column 715 in connection with "youtube.com" may prevent supplemental bandwidth (e.g., secondary path data 450 via wireless access network 160, FIG. 4) from being used for purposes of the "youtube.com" application on any registered user device 136 in local subscriber network 130.

Always enable boosting column 720 may indicate an option to enable bandwidth boosting services associated with the particular application. For example, selection of always enable boosting column 720 in connection with "NFL Mobile" may enable supplemental bandwidth for purposes of the "NFL Mobile" application on any registered user device 136 in local subscriber network 130.

Enable per-session boosting column 725 may indicate an option to selectively enable/disable bandwidth boosting services associated with the particular application. For example, selection of enable per-session boosting column 725 in connection with "Netflix" may cause user device 136 to prompt a user to selectively enable/disable supplemental bandwidth each time the "Netflix" application is launched on any registered user device 136 in local subscriber network 130.

Selections of disable boosting column 715, always enable boosting column 720, or enable per-session boosting column 725 in table 705 may be mutually exclusive for a particular application. Thus, selection, by a user, of one of disable boosting column 715, always enable boosting column 720, or enable per-session boosting column 725 may remove a previous (or default) selection corresponding the particular application.

Referring to FIG. 7B, user interface 750 illustrates an advanced settings interface for an account administrator to configure settings for bandwidth boosting services on a per-device basis. As shown in FIG. 7B, user interface 750 may include a table 755 that further includes a device column 760, a disable boosting column 765, an always enable boosting column 770, an enable per-session boosting column 775, and a variety of entries 780 for columns 760 through 775.

Device column 760 may include a list of registered user devices 136 for local subscriber network 130. In one implementation, devices in device column 760 may be populated by web services module 610 based on previous registration procedures (e.g., by an account administrator).

Disable boosting column 765 may indicate an option to disable bandwidth boosting services associated with a particular user device 136 (e.g., corresponding to a device in device column 760). For example, selection of disable boosting column 765 in connection with "Bobby's iPad" may prevent supplemental bandwidth (e.g., secondary path data 450 via wireless access network 160, FIG. 4) from being used with any applications on the corresponding user device 136 (e.g., "Bobby's iPad") in local subscriber network 130.

Always enable boosting column 770 may indicate an option to enable bandwidth boosting services associated with the particular device (e.g., identified in device column 760). For example, selection of always enable boosting column 770 in connection with "Dad's Big TV" may enable supplemental bandwidth on the corresponding registered user device 136 in local subscriber network 130 whenever user device 136 connects with boosting router 134.

Enable per-session boosting column 775 may indicate an option to selectively enable/disable bandwidth boosting services associated with the particular user device 136 (e.g., identified in device column 760). For example, selection of enable per-session boosting column 775 in connection with "Mommy's Droid" may cause user device 136 to prompt a user to selectively enable/disable supplemental bandwidth as a user configurable setting on user device 136 or each time user device 136 connects with boosting router 134.

In some implementations, the per-device settings of user interface 750 may supersede the per-application settings of user interface 700 or vice versa. That is, a user may configure the advanced settings of user interfaces 700/750 to whitelist specific applications for any and all users, or just some users. For example, all devices could use boosting services for a particular streaming video service (e.g., Netflix), or only Bobby's iPad and Dad's Big TV could use boosting services for Netflix. Additionally, or alternatively, a user may configure the advanced settings of user interfaces 700/750 to blacklist specific applications for any and all users, or just some users. For example, all devices could be restricting from boosting services for a particular service (e.g., YouTube), or only Bobby's iPad could be restricted from using boosting services for YouTube. According to other implementations, user interfaces 700/750 may include additional options, fewer options, or different options than shown in FIGS. 7A and 7B.

FIGS. 8A and 8B are diagrams that depict exemplary reporting user interfaces 800/850 that may be presented to a user (e.g., via user device 136). In one implementation, user interfaces 800/850 may be provided via control server 140 (e.g., web services module 610). In another implementation, user interfaces 800/850 may be included within a bandwidth boosting application, resident on user device 136, for the bandwidth boosting services. User interfaces 800/850 may relate to a particular user device 136 or application used within local subscriber network 130.

Referring to FIG. 8A, user interface 800 illustrates an amount of bandwidth that would have been available to be used during a previous billing cycle. User interface 800 may be generated, for example, based on usage statistics from boosting router 134 (e.g., usage data 460) and/or statistics from a subscriber's wireless data plan. A bandwidth threshold for a standard definition video stream ("SD") and a bandwidth threshold for a high definition video stream ("HD") are shown. User interface 800 shows that for any given day in the billing period shown, sufficient bandwidth was available from the bandwidth boosting service to enable an upgrade from SD-quality video to HD-quality video. In one implementation, user interface 800 may be scrolled forward or backward to present different billing periods.

Referring to FIG. 8B, user interface 850 illustrates an amount of data that was used from a subscriber's wireless data plan and what portion of the data was attributable to bandwidth boosting services. Similar to user interface 800, user interface 850 may be generated, for example, based on usage statistics from boosting router 134 (e.g., usage data 460) and/or statistics from the subscriber's wireless data plan. A data threshold corresponding to the pre-paid data limit of the subscriber's wireless data plan ("2 GB Plan") is presented along with a graphical representation of the total data used and the amount of data (of the total) that was attributable to bandwidth boosting services. User interface 850 shows that, for the billing period shown, nearly 0.5 Gigabytes (GB), or nearly 25 percent, of the pre-paid data limit was unused. In another implementation user interface 850 may present data usage for a current (e.g., incomplete) billing period.

Although user interfaces 800/850 provide illustrations of data usage in a graphical format, in other implementations different data and/or presentation formats (including graphical or text-based formats) may be used. For example, user interfaces 800/850 may present other impacts of boosting in terms of buffering ratio, start up time, failures, and other video quality metrics or application quality metrics that consumers relate to, with and without bandwidth boosting services. According to other implementations, user interfaces 800/850 may include additional data or different data than shown in FIGS. 8A and 8B.

FIG. 9 is a flow diagram of an exemplary process 900 for selectively providing bandwidth boosting services to user devices in a local subscriber network. In one implementation, process 900 may be performed by control server 140. In other implementations, process 900 may be performed by one or more devices from content provider network 110 and/or local subscriber network 130.

Process 900 may include providing a user interface to configure preferences for bandwidth boosting services (block 910) and receiving user configuration preferences for bandwidth boosting services (block 920). For example, control server 140 may provide a web-based user interface to solicit user input from, for example, an account administrator. The user input may be provided to control server 140 as user and/or device boost preferences 310 or other information. In another implementation, a local application on user device 136 may be used to solicit and provide user and/or device boost preferences 310 to control server 140.

Process 900 may further include providing configuration settings, based on the configuration preferences, to boosting router (block 930). For example, control server 140 may format user and/or device boost preferences 310, if necessary, and provide the substance of user and/or device boost preferences 310 to boosting router 134 as boost configuration settings 320.

Process 900 may also include receiving a boost request for content delivery to a user device (block 940) and generating split-path instruction for content delivery to the user device via a primary data path and a supplemental data path (block 950). For example, if a boost request is initiated from an authorized device or application, boosting router 134 may forward a request for bandwidth boosting services (e.g., boost request 420) to control server 140. In response to the boost request, control server 140 may generate a split path instruction to route data over a primary data path and a secondary (or supplemental) data path.

Process 900 may additionally include recording bandwidth usage of the supplemental data path (block 960). For example, boosting router 134 may log the amount of data received via a supplemental path (e.g., secondary path data 450) and provide the logged amount to control server 140.

FIG. 10 is a flow diagram of an exemplary process 1000 for locally controlling bandwidth boosting services for user devices in a local subscriber network. In one implementation, process 1000 may be performed by boosting router 134. In other implementations, process 1000 may be performed by one or more devices from content provider network 110 and/or local subscriber network 130. For example, some blocks of process 1000 may be performed by an application residing on user device 136.

Process 1000 may include receiving user configuration preferences for bandwidth boosting services (block 1010) and receiving a boost request from a user device (block 1020). For example, boosting router 134 may receive boost configuration settings 320 from control server 140. At a later time, boosting router 134 may receive a boost request (e.g., boost request 420) from one of user devices 136 within local subscriber network 130.

Process 1000 may also include comparing the boost request against the configuration settings (block 1030) and determining if the boost request complies with the configuration settings (block 1040). For example, for example, boosting router 134 may identify the source device and/or application that generated boost request 420 and determine, based on boost configuration settings 320, if boosting is enabled for the particular device and/or application.

If the boost request does not comply with the configuration settings (block 1040—NO), the boost request may be rejected and content forwarded to the user device via a primary data path (block 1050). For example, boosting router 134 may reject boost request 420 and requested data 410 from content server 150 may continue to be provided to user device 136 via only a primary data path.

If the boost request complies with the configuration settings (block 1040—YES), the boost request may be forwarded to control server 140 (block 1060), data may be received over the primary data path and a secondary data path (block 1070), and the data from the primary data path and the secondary data path may be merged (block 1080). For example, boosting router 134 may forward boost request 420 to control server 140, causing control server 140 to generate split-path instruction 430. Network element 112 of provider network 110 may distribute requested data 410 over a primary (e.g., wired) path and a secondary (e.g., cellular broadband) path. Boosting router 134 may receive primary path data 440 and secondary path data 450, combine the data 440/450 into a single stream, and forward the combined data to user device 136.

Referring again to FIGS. 1, 3 and 4, an exemplary use case is provided according to implementations described herein. Assume user device 136-1 (e.g., a tablet computer) has a bandwidth boost application installed and is a registered device within local subscriber network 130 that has configured user device 136-1 as fully enabled for bandwidth boosting. Assume further that user device 136-1 submits a request to stream "Movie A" from content server 150 via a primary DSL connection.

User device 136-1 sends the steaming request to provider network 110. Network element 112 (not shown) in provider network 110 detects sub-optimal bandwidth and recommends use of bandwidth boosting service to user device 136-1. The bandwidth boosting recommendation may appear, for example, as a pop-up window displayed user device 136-1.

In response to the recommendation, a user may launch the local bandwidth boost application and/or access a web page from control server 140. The user may log in using credentials (e.g., username and password) for the corresponding broadband wireless account associated with wireless access network 160. The user may activate the bandwidth boosting service from within the bandwidth boost application or via the web page, triggering boosting router 134. The user may then continue or re-start "Movie A". Boosting router 134 may verify that user device 136-1 is fully enabled for bandwidth boosting. Boosting router 134 may signal control server 140 to provide supplemental bandwidth for "Movie A" on user device 136. In response, control server 140 signals provider network 110 to aggregate available broadband wireless bandwidth and DSL bandwidth available to local subscriber network 130. Separate DSL and broadband wireless streams are received at boosting router 134 and forwarded to user device 136-1 as a single stream. Thus, the user of user device 136-1 may view "Movie A" with higher bitrates than normal by leveraging the incremental bandwidth available.

In systems and methods described herein, a network device may provide, to a user device, a user interface to configure preferences for a bandwidth boosting service. The bandwidth boosting service may be configured to supplement a subscriber's primary content delivery connection with additional bandwidth from a broadband cellular connection. The network device may receive, via the user interface, user configuration preferences for the bandwidth boosting service and may provide, to a boosting router at the subscriber's premises, configuration settings that are based on the configuration preferences. The network device may receive, from the boosting router, a boost request for content delivery to a user device at the subscriber's premises and may generate, in response to the boost request, a split-path instruction for the content delivery via a primary data path and a supplemental data path.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 9 and 10, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:

providing, by a network device in a service provider network, to a user device, multiple user interfaces to enable a subscriber to assign user permissions, device permissions, bandwidth usage limits, notifications, and user preferences for using a bandwidth boosting service, with respect to content deliveries via a plurality of user devices registered for a local subscriber network, wherein the multiple user interfaces include:

a first user interface including a first list identifying the plurality of user devices and corresponding user-selectable mutually exclusive settings of disable boosting, always enable boosting, and enable per-session boosting corresponding to each user device, wherein the first user interface solicits user configuration preferences on a per-device basis, and a second user interface including a second list identifying applications resident on the plurality of user devices and corresponding user-selectable mutually exclusive settings of disable boosting, always enable boosting, and enable per-session boosting corresponding to each application, wherein the second user interface solicits the user configuration preferences on a per-application basis;

receiving, by the network device from the subscriber, the user configuration preferences identifying device-specific boosting enablement for the plurality of user devices via the first user interface, and application-specific boosting enablement for the plurality of applications via the second user interface;

receiving, via the first or second user interface, user input causing the device-specific boosting enablement to supersede the application-specific boosting enablement or causing the application-specific boosting enablement to supersede the device-specific boosting enablement;

providing, by the network device, to a boosting router at the local subscriber network, configuration settings that are used to enforce the device-specific boosting enablement and the application-specific boosting enablement identified in the user configuration preferences, wherein the configuration settings include:

a first setting of always enable boosting for at least one of the user devices presented via the first user interface or the applications presented via the second user interface, a second setting of disable boosting for at least a second one of the user devices presented via the first user interface or the applications presented via the first user interface, and a third setting of per-session boosting enablement for at least a third one of the user devices presented via the first user interface or the applications presented via the first user interface;

receiving, by the network device and from the boosting router, a boost request for a content delivery to the first user device via the first application at the local subscriber network;

comparing, by the network device, device-specific information and application-specific information corresponding to the first user device and included in the boost request to the configuration settings; and generating, by the network device and in response to results of the comparing, a split-path instruction for the content delivery to the first user device for the first application via a primary data path and a supplemental data path, wherein the primary data path includes a digital subscriber line (DSL) or a fiber path, and wherein the supplemental data path includes a broadband cellular connection.

2. The method of claim 1, further comprising:

recording bandwidth usage of the supplemental data path for the content delivery.

3. The method of claim 1, further comprising:
providing, by the network device, to the user device, another user interface to report bandwidth consumption for the content delivery associated with the bandwidth boosting service.

4. The method of claim 1, further comprising:
receiving, by the boosting router, from the user device, a boost request from the user device.

5. The method of claim 1, further comprising:
monitoring bandwidth consumption over the supplemental data path;
comparing the monitored bandwidth consumption against a data plan threshold associated with a subscriber account; and
sending a notification to one or more users, associated with the subscriber account, when the monitored bandwidth consumption reaches the data plan threshold.

6. The method of claim 1, further comprising:
receiving, from a second one of the user devices, another boost request for the content delivery;
comparing device-specific and application specific information in the other boost request to the configuration settings; and
rejecting the other boost request for the content delivery when at least one the device-specific and application specific information in the other boost request corresponds to the second setting of the configuration settings.

7. The method of claim 1, further comprising:
receiving, by the boosting router, data for the content delivery via the primary data path and the supplemental data path;
merging, by the boosting router, the received data for the content delivery into a single stream; and
forwarding, by the boosting router, the single stream to the user device.

8. A network device, comprising:
a memory to store instructions;
a processor configured execute instructions in the memory to:
provide, to a user device, multiple user interfaces to enable a subscriber to assign user permissions, device permissions, bandwidth usage limits, notifications, and user preferences for using a bandwidth boosting service with respect to content deliveries via a plurality of user devices registered for a local subscriber network, wherein the multiple user interfaces include:
a first user interface including a first list identifying the plurality of user devices and selectable mutually exclusive settings of disable boosting, always enable boosting, and enable per-session boosting corresponding to each user device, wherein the first user interface solicits user configuration preferences on a per-device basis, and
a second user interface including a second list identifying applications resident on the plurality of user devices and selectable mutually exclusive settings of disable boosting, always enable boosting, and enable per-session boosting corresponding to each application, wherein the second user interface solicits the user configuration preferences on a per-application basis;
receive, via at least one of the multiple user interfaces and from an administrator of the local subscriber network, the user configuration preferences identifying device-specific boosting permission for the plurality of user devices and application-specific boosting permission for the plurality of applications for accessing the bandwidth boosting service;
receive, via the first or second user interface, user input causing the device-specific boosting enablement to supersede the application-specific boosting enablement or causing the application-specific boosting enablement to supersede the device-specific boosting enablement;
provide, to a boosting router at the local subscriber network, configuration settings that are used to enforce the device-specific boosting permission and the application-specific boosting permission identified in the user the configuration preferences, wherein the configuration settings include:
a first setting of always enabled boosting for at least one of the user devices presented via the first user interface or the applications presented via the second user interface,
a second setting of disable boosting for at least a second one of the user devices presented via the first user interface or the applications presented via the second user interface, and
a third setting of per-session boosting enablement for at least a third one of the user devices presented via the first user interface or the applications presented via the second user interface;
receive, from the boosting router, a boost request for a content delivery to a first one of the user devices executing a first one of the applications at the local subscriber network;
compare, in response to the boost request, device-specific information and application-specific information corresponding to the first user device and included in the boost request to the configuration settings; and
generate, in response to results of the comparing, a split-path instruction for the content delivery to the first user device for the first one of the applications via a primary data path and a supplemental data path, wherein the primary data path includes a digital subscriber line (DSL) or a fiber path, and wherein the supplemental data path includes a broadband cellular connection.

9. The device of claim 8, wherein the processor is further configured to execute the instructions to:
provide, to the first user device, another user interface to solicit bandwidth consumption limits for a subscriber account associated with the supplemental data path.

10. The device of claim 9, wherein the bandwidth consumption limits are applied across one of:
multiple ones of the user devices accessing the boosting router, or
all of the content delivery provided to the boosting router via the supplemental data path.

11. A non-transitory computer-readable medium, storing instructions executable by one or more processors, the non-transitory computer-readable medium comprising one or more instructions to:
provide, to a user device, multiple user interfaces to enable a subscriber to assign user permissions, device permissions, bandwidth usage limits, notifications, and user preferences for using a bandwidth boosting service, wherein the bandwidth boosting service is used to supplement a subscriber's primary content delivery connection with additional bandwidth from a broadband cellular connection with respect to content deliveries via a plurality of user devices registered for a local subscriber network, wherein the multiple user interfaces include:
- a first user interface including a first list identifying the plurality of user devices and selectable mutually exclusive settings of disable boosting, always enable boosting, and enable per-session boosting corresponding to each user device, wherein the first user interface solicits user configuration preferences on a per-device basis, and
- a second user interface including a second list identifying applications resident on the plurality of user devices and selectable mutually exclusive settings of disable boosting, always enable boosting, and enable per-session boosting corresponding to each application, wherein the second user interface solicits the user configuration preferences on a per-application basis;

receive, from the subscriber, the user configuration preferences identifying at least one of device-specific boosting enablement for the plurality of user devices via the first user interface, or application-specific boosting enablement for the plurality of applications via the second user interface;

receive, via the first or second user interface, user input causing the device-specific boosting enablement to supersede the application-specific boosting enablement or causing the application-specific boosting enablement to supersede the device-specific boosting enablement;

provide, to a boosting router at the local subscriber network, configuration settings that are used to enforce the at least one of device-specific boosting enablement or application-specific boosting enablement identified in the user configuration preferences, wherein the configuration settings include:
- a first setting of always enable boosting for at least one of the user devices presented via the first user interface or the applications presented via the second user interface,
- a second setting of disable boosting for at least a second one of the user devices presented via the first user interface or the applications presented via the second user interface, and
- a third setting of per-session boosting enablement for at least a third one of the user devices presented via the first user interface or the applications presented via the second user interface;

receive, via the first or second user interfaces, user input causing the device-specific boosting enablement to supersede the application-specific boosting enablement or causing the application-specific boosting enablement to supersede the device-specific boosting enablement;

receive, from the boosting router, a boost request for a content delivery to the first user device via the first application at the local subscriber network;

compare, to the configuration settings, device-specific information and application-specific information corresponding to the first user device and included in the boost request; and generate, in response to results of the comparing, a split-path instruction for the content delivery to the first user device for the first application via a primary data path and a supplemental data path, wherein the primary data path includes a digital subscriber line (DSL) or a fiber path, and wherein the supplemental data path includes a broadband cellular connection.

12. The non-transitory computer-readable medium of claim 11, wherein the multiple user interfaces are included within one or more of:
- a web page accessible via the user device, or
- an application stored in a local memory of the user device.

13. The non-transitory computer-readable medium of claim 12, further comprising one or more instructions to:
receive, from the boosting router, bandwidth consumption records, for the bandwidth boosting service, associated with a wireless data plan.

14. The non-transitory computer-readable medium of claim 12, further comprising one or more instructions to:
record bandwidth usage of the supplemental data path for the content delivery.

15. The non-transitory computer-readable medium of claim 14, further comprising one or more instructions to:
compare the monitored bandwidth consumption against a data plan threshold associated with a subscriber account; and
send a notification to one or more users, associated with the subscriber account, when the monitored bandwidth consumption reaches the data plan threshold.

16. The non-transitory computer-readable medium of claim 12, further comprising one or more instructions to:
receive, from a second one of the user devices, another boost request for the content delivery;
compare device-specific and application specific information in the other boost request to the configuration settings; and
reject the other boost request for the content delivery when at least one the device-specific and application specific information in the other boost request corresponds to the second setting of the configuration settings.

17. The network device of claim 8, wherein the multiple user interfaces are included within one or more of:
a web page accessible via the user device, or
an application stored in a local memory of the user device.

18. The network device of claim 8, wherein the processor is further configured to execute the instructions to:
receive, from the boosting router, bandwidth consumption records, for the bandwidth boosting service, associated with a wireless data plan.

19. The network device of claim 8, wherein the processor is further configured to execute the instructions to:
record bandwidth usage of the supplemental data path for the content delivery.

20. The network device of claim 19, wherein the processor is further configured to execute the instructions to:
compare the monitored bandwidth consumption against a data plan threshold associated with a subscriber account; and
send a notification to one or more users, associated with the subscriber account, when the monitored bandwidth consumption reaches the data plan threshold.

* * * * *